United States Patent
Igawa et al.

(10) Patent No.: US 10,430,699 B2
(45) Date of Patent: Oct. 1, 2019

(54) IMAGE PROCESSING APPARATUS, IMAGE PROCESSING METHOD, AND COMPUTER-READABLE RECORDING MEDIUM

(71) Applicants: Hiroyuki Igawa, Kanagawa (JP); Hideki Kamaji, Kanagawa (JP)

(72) Inventors: Hiroyuki Igawa, Kanagawa (JP); Hideki Kamaji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/896,542

(22) Filed: Feb. 14, 2018

(65) Prior Publication Data

US 2018/0239998 A1    Aug. 23, 2018

(30) Foreign Application Priority Data

Feb. 20, 2017    (JP) .................................. 2017-028617

(51) Int. Cl.
  *G06K 15/02*    (2006.01)
  *G06K 15/10*    (2006.01)
  (Continued)

(52) U.S. Cl.
  CPC ....... *G06K 15/1877* (2013.01); *G06K 15/107* (2013.01); *G06K 15/1822* (2013.01); *G06K 15/1881* (2013.01); *H04N 1/1915* (2013.01); *H04N 1/4051* (2013.01); *H04N 1/4055* (2013.01); *H04N 1/52* (2013.01); *G06K 2215/111* (2013.01)

(58) Field of Classification Search
CPC combination set(s) only.
See application file for complete search history.

(56) References Cited

U.S. PATENT DOCUMENTS 7,130,084 B2    10/2006  Fujita
2002/0114012 A1  8/2002  Fujita
(Continued)

FOREIGN PATENT DOCUMENTS

JP    2002-223357 A    8/2002
JP    2005-027109      1/2005
(Continued)

OTHER PUBLICATIONS

Extended European Search Report dated Jun. 7, 2018 in Patent Application No. 18157393.2, 9 pages.

*Primary Examiner* — Helen Zong
(74) *Attorney, Agent, or Firm* — Oblon, McClelland, Maier & Neustadt, L.L.P.

(57) ABSTRACT

An image processing apparatus includes a storage and processing circuitry. The storage is configured to store a dither table in which a plurality of dither patterns are recorded, each of the dither patterns being formed with a halftone dot screen in which an output area ratio that is a proportion of void halftone dots per unit area corresponds to any one of gradation values of image data. The processing circuitry is configured to read a gradation value for each region in image data input for each toner color, decide a dither pattern to be applied to the read gradation value, read out the decided dither pattern from the dither table, and perform dither processing of applying the read dither pattern to the region in the image data.

6 Claims, 13 Drawing Sheets

(51) Int. Cl.
*H04N 1/405* (2006.01)
*H04N 1/191* (2006.01)
*H04N 1/52* (2006.01)

(56) References Cited

U.S. PATENT DOCUMENTS

| | | |
|---|---|---|
| 2005/0002048 A1 | 1/2005 | Takahashi et al. |
| 2006/0221395 A1 | 10/2006 | Komatsu |
| 2007/0195372 A1 | 8/2007 | Ishii et al. |
| 2010/0253980 A1 | 10/2010 | Komatsu |
| 2011/0249277 A1 | 10/2011 | Kato et al. |
| 2016/0034794 A1* | 2/2016 | Igawa .............. H04N 1/40 358/3.14 |
| 2016/0167414 A1* | 6/2016 | Yanai .............. B41J 29/38 347/14 |
| 2017/0013171 A1 | 1/2017 | Igawa et al. |
| 2018/0035009 A1* | 2/2018 | Toshihiro .......... G06K 15/1835 |

FOREIGN PATENT DOCUMENTS

| | | |
|---|---|---|
| JP | 2006-279395 | 10/2006 |
| JP | 2007-020117 | 1/2007 |

* cited by examiner (a)   (b)

IMAGE PROCESSING APPARATUS, IMAGE PROCESSING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2017-028617, filed on Feb. 20, 2017. The contents of which are incorporated herein by reference in their entirety.

BACKGROUND OF THE INVENTION

1. Field of the Invention

The present invention relates to an image processing apparatus, an image processing method, and a computer-readable recording medium.

2. Description of the Related Art

The color stability of images formed by electrophotography is generally inferior to the color stability of images formed by offset printing. Various attempts then have been made to bring the color stability in electrophotography closer to the level of offset printing. One difference between electrophotography and offset printing is the difference in gradation expression. In electrophotography, image data is drawn using screens. More specifically, image processing using screens such as a line screen, a halftone dot screen, and an FM screen is performed on image data to represent intermediate gradation in a pseudo manner. Among those, the halftone dot screen, which is most frequently used in offset printing, is able to output images most similar to those of offset printing, compared with when the other screens are used. For this reason, the halftone dot screen is often used as a default screen especially in production print (PP) devices.

With not only the halftone dot screen but also any other screens, electrophotography is inferior to offset printing in terms of geometric patterns produced in a pseudo manner by overlapping of dots of different colors, that is, the degree of texture, when an image is formed. An example then has been introduced in which the dot growth method for a halftone dot screen is changed and thus the texture produced when a halftone dot screen is used can be reduced.

Unfortunately, such a conventional technique can reduce the occurrence of texture but fails to achieve both reduction in texture and improvement in color stability of images.

SUMMARY OF THE INVENTION

According to one aspect of the present invention, An image processing apparatus includes a storage and processing circuitry. The storage is configured to store a dither table in which a plurality of dither patterns are recorded, each of the dither patterns being formed with a halftone dot screen in which an output area ratio that is a proportion of void halftone dots per unit area corresponds to any one of gradation values of image data. The processing circuitry is configured to read a gradation value for each region in image data input for each toner color, decide a dither pattern to be applied to the read gradation value, read out the decided dither pattern from the dither table, and perform dither processing of applying the read dither pattern to the region in the image data.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
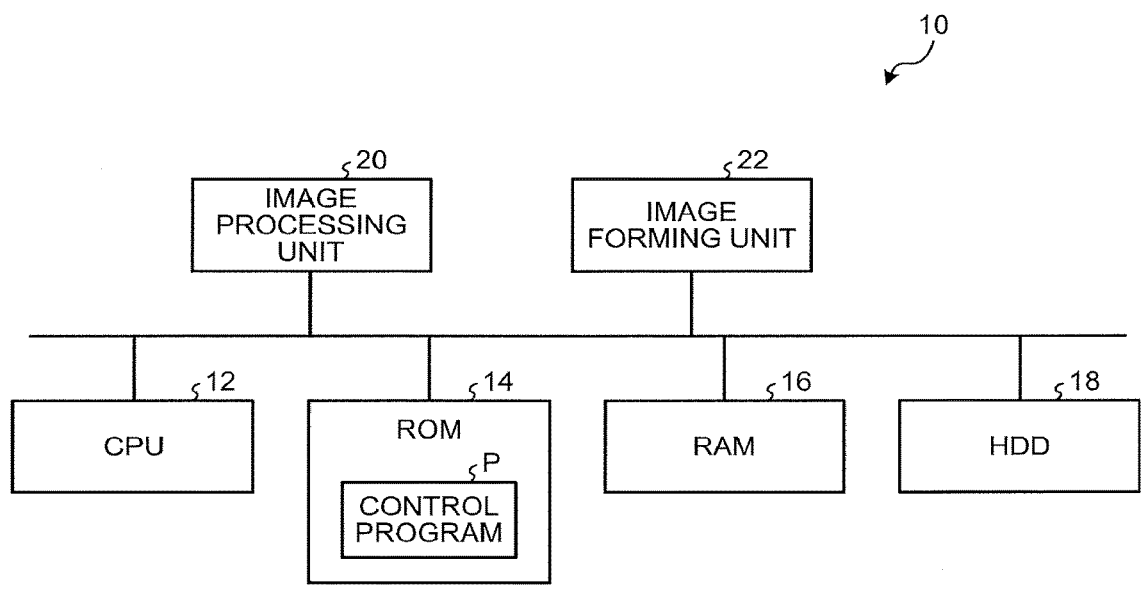
FIG. 1 is a hardware block diagram illustrating a hardware configuration of an image forming apparatus according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an image processing apparatus, an image processing method, and a computer-readable recording medium that can achieve both reduction in texture produced in a pseudo manner and improvement in color stability of images in a gradation range from intermediate gradation to high gradation in electrophotography.

Hardware Configuration of Image Processing Apparatus

FIG. 1 is a hardware block diagram illustrating a system configuration of an image forming apparatus 10 as an example of the image processing apparatus according to the present embodiment. The image forming apparatus 10 is implemented as, for example, a copier, a printer such as a laser printer, a facsimile, or a multifunction peripheral having at least one of the copier function, the printer function, and the facsimile function. The image forming apparatus 10 may form either monochrome images or color images by superimposing toner colors including yellow (Y), magenta (M), cyan (C), and black (K). The image forming apparatus 10 includes an image processing unit 20, a central processing unit (CPU) 12, a read only memory (ROM) 14, a random access memory (RAM) 16, a hard disk drive (HDD) 18, and an image forming unit 22. The units are connected to each other through a bus line.

Figure 2:
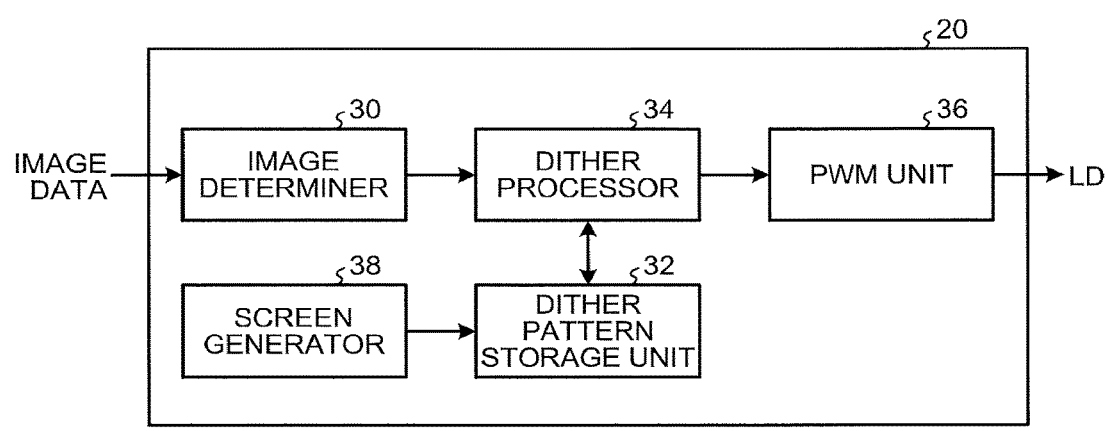
FIG. 2 is a functional block diagram illustrating a functional configuration of an image processing unit.

The image processing unit 20 is mounted on, for example, a controller board of the image forming apparatus 10 to perform the input image data image processing (dither processing) of applying a dither pattern corresponding to a gradation value of the image data and output the result of the image processing to the image forming unit 22. The image processing unit 20 is configured, for example, as illustrated in FIG. 2 described later. The CPU 12 expands a control program P stored in the ROM 14 onto the RAM 16 and uses the RAM 16 as a working memory whereby the image processing unit 20 executes predetermined processing as will be described later. The HDD 18 includes a dither pattern storage unit 32 (FIG. 2) described later.

If the image forming apparatus is a laser printer, the image forming unit 22 includes an optical writing unit including a laser optical system and a write control unit. Based on the image signal from the image processing unit 20, the image forming unit 22 performs laser modulation with the image signal to expose the photoconductor. This exposure forms a latent image of a dot image on the charged photoconductor. The image forming unit 22 then performs known processes for typical electrophotographic devices such as developing, transfer, and fixing to form a desired image (electrophotography) on a recording sheet.

Functional Configuration of Image Forming Apparatus

FIG. 2 is a functional block diagram illustrating the functions of the image processing unit 20. The image processing unit 20 includes an image determiner 30, a dither pattern storage unit 32, a dither processor 34, a PWM unit 36, and a screen generator 38.

The image determiner 30 determines a gradation value for each certain range of the image data read by the image processing unit 20. That is, the image determiner 30 reads image information (gradation value) of a halftone region (intermediate gradation region) from the input image data.

The image data is digital data having continuous gradation values obtained from, for example, an original image. In general, the image data is input to the image forming apparatus 10 in the form of image data for each of color components including red (R), green (G), and blue (B). For image formation, image data for each of color components of cyan (C), magenta (M), yellow (Y), and black (K) corresponding to toner colors is necessary, rather than color components such as red (R), green (G), and blue (B). As used herein, "image data" refers to image data corresponding to toner colors. The conversion of image data from color components such as red (R), green (G), and blue (B) to toner colors is a common technical matter and will not be further elaborated here.

The dither processor 34, which is an example of the dither decider, decides a dither pattern to be applied, based on the gradation value determined by the image determiner 30 for the read image data. The dither processor 34 then reads out a dither pattern stored in the dither pattern storage unit 32, which is an example of the dither table, and executes dither processing of applying the read dither pattern to a corresponding region in the image data. The dither pattern storage unit 32 is stored in advance as a plurality of different dither patterns in the HDD 18 (FIG. 1). In the present embodiment, a halftone dot screen formed using the void halftone dot shape described later is used as the dither pattern.

If the image forming apparatus 10 has the laser printer function, the PWM unit 36 performs pulse width modulation (PWM) of generating a pulse signal having a pulse width corresponding to the gradation value, based on the image data subjected to the dither processing by the dither processor 34, in order to change the exposure time per pixel in accordance with the gradation value of the image data. Subsequently, the pulse signal generated by the PWM unit 36 is provided to a laser diode (LD) included in the optical writing unit not-illustrated in FIG. 2. The LD turns on/off in accordance with the pulse signal to perform necessary exposure for the photoconductor.

Figure 6:
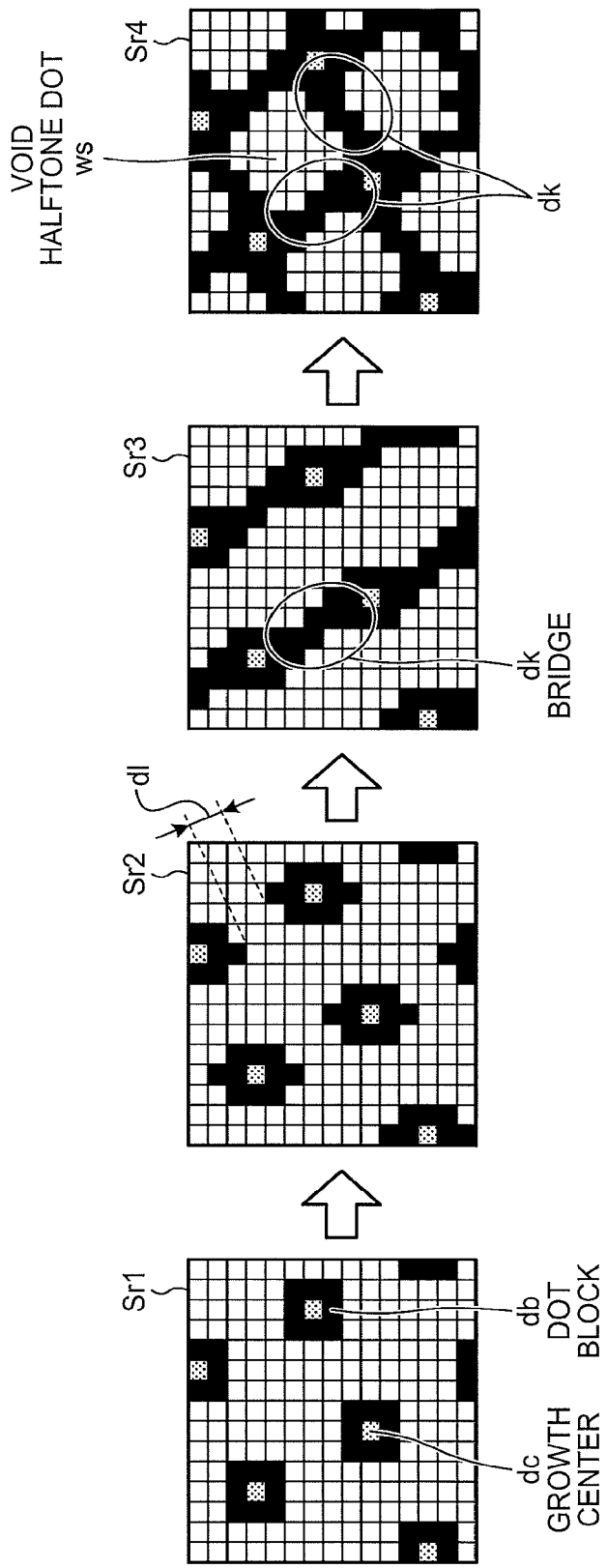
FIG. 6 illustrates an example of generation of a dither pattern.

The screen generator 38 performs screen generation processing of generating a dither pattern corresponding to each gradation value of image data. Specifically, as illustrated in FIG. 6 later, the screen generator 38 sets a plurality of dots (halftone dots) as growth centers dc on a screen and forms dot blocks db around the dots. Subsequently, when the distance dl between adjacent dot blocks db becomes equal to or less than a predetermined value as the dot blocks db grow, the screen generator 38 forms bridges dk to connect the adjacent dot blocks db to each other and forms void halftone dots ws. The screen generator 38 stores the generated dither pattern into the dither pattern storage unit 32.

Figure 3:
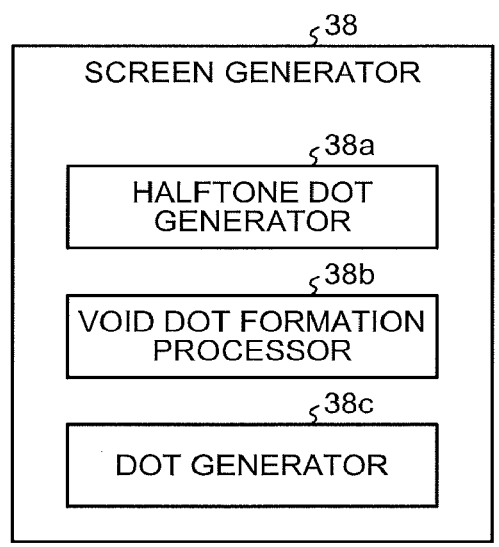
FIG. 3 is a functional block diagram illustrating a detailed functional configuration of a screen generator.

FIG. 3 is a functional block diagram illustrating the detailed functional configuration of the screen generator 38. As illustrated in FIG. 3, the screen generator 38 includes a halftone dot generator 38a, a void dot formation processor 38b, and a dot generator 38c.

The halftone dot generator 38a generates a dot image in a halftone dot shape until the distance dl between dot blocks db of a halftone dot screen reaches a predetermined value. When the distance dl between dot blocks db becomes equal to or less than a predetermined value, the void dot formation processor 38b generates a bridge dk by connecting dot blocks db by a dot image at the smallest gradation number. Then, a void halftone dot shape is formed until a gradation value is reached at which an image defect such as banding as described later appears. After the formation of the void halftone dot shape is completed, the dot generator 38c generates a dot image so as to fill the void portion formed as a void halftone dot. The detailed operation of the halftone dot generator 38a, the void dot formation processor 38b, and the dot generator 38c will be described later.

Occurrence of Texture in Use of Halftone Dot Screen

Before the operation of the image forming apparatus 10 is described, texture that conventionally occurs when a halftone dot screen is used for forming an electrophotographic image will be described.

Figure 4:
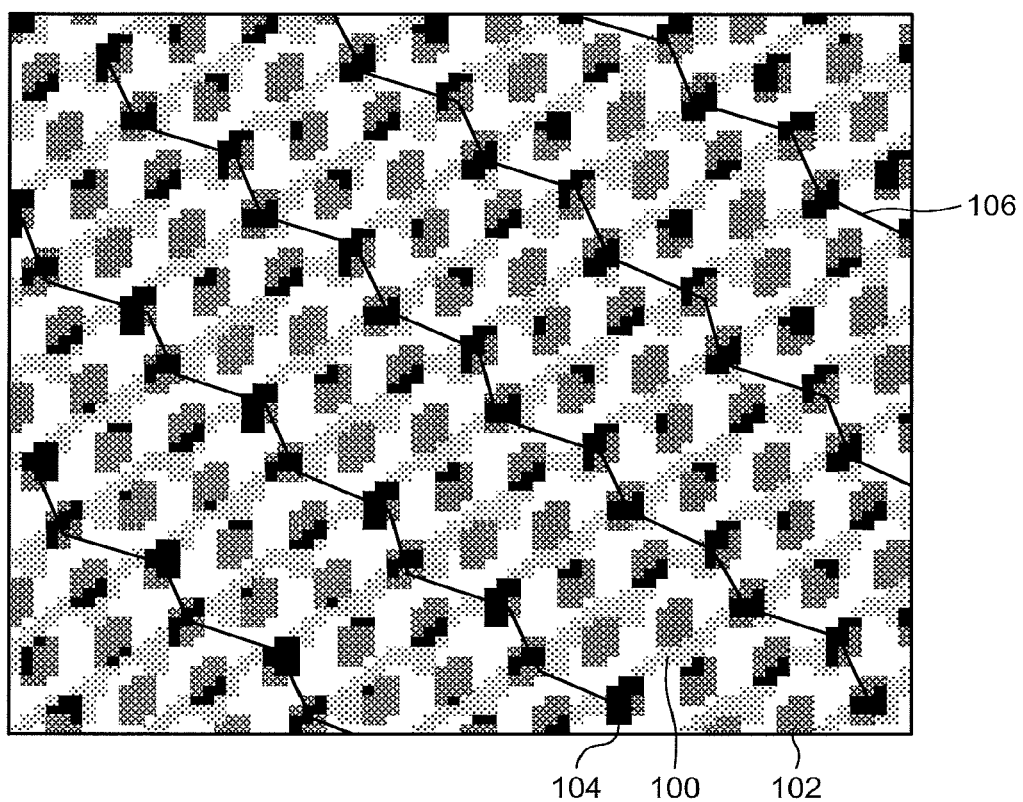
FIG. 4 is a diagram illustrating how texture is produced by overlapping of dots.

FIG. 4 illustrates an example in which diagonal texture occurs. FIG. 4 illustrates how two colors (Y&K) overlap each other. Specifically, a region 100 is a region to which yellow (Y) toner adheres, and a region 102 is a region to which black (K) toner adheres. A region 104 is a region to which yellow toner and black toner adhere in an overlapping manner. The portion indicated by a solid line 106 represents pseudo texture produced by the continuous region 104. Electrophotography is characterized in that adhering toner spreads at a portion where colors overlap. Then, when colors overlap at a certain portion, toner adhering to the portion in a spreading manner makes the portion darker in color than the other portions. Accordingly, when there is color overlapping as in the region 104, color tones are separated diagonally, such as a dark color portion, a light portion, a dark portion, a light portion, . . . to produce diagonal texture.

Texture tends to appear less when the screen of each color has a high number of lines, for example, 200 lpi (line per inch). However, a screen with a low number of lines of about 175 lpi, which is most frequently used in offset printing, can have enhanced color stability if a proper combination of the screen angle and the number of lines for each color is selected, and thus may be used for emphasizing color stability rather than texture. Thus, simply increasing the number of screen lines does not lead to a solution for avoiding the occurrence of texture. The reasons why the screen that has a high number of lines provides less noticeable texture are: that the color overlapping cycle has a high frequency to make texture less noticeable; and the area lacking toner is reduced, so that the brightness difference at the adjacent portion is less noticeable. Therefore, if this effect is achieved with a low number of lines, both avoidance of the occurrence of texture and high color stability can be achieved at the same time.

Figure 5:
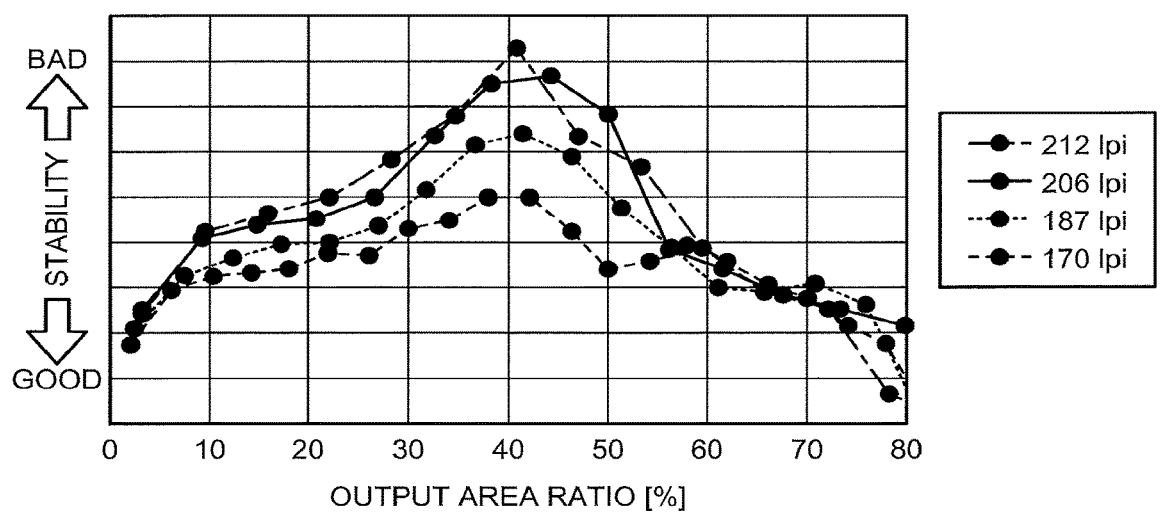
FIG. 5 is a graph illustrating an example of the relation between the number of screen lines and color stability.

The present embodiment achieves both reduction in texture produced in a pseudo manner and high color stability, using a screen with a low number of lines in the neighborhood of 175 lpi. FIG. 5 is a diagram illustrating color stability for each of the numbers of screen lines of halftone dot screens. In FIG. 5, the horizontal line indicates the output area ratio, which is a proportion of void halftone dots per unit area, and the vertical line indicates the color stability. It is understood from FIG. 5 that the higher the number of screen lines is, the worse the color stability is. That is, it can be understood that the color stability is good at low gradation (a low output area ratio) and the color stability is worse at intermediate gradation (an output area ratio of 40 to 50%). The likelihood that texture is caused by color overlapping in a screen with a low number of lines has been examined. As a result of the examination, it has been found that the occurrence of texture is unlikely to be avoided in a low gradation region.

Based on the foregoing, both reduction in texture and high color stability are likely to be achieved at the same time by increasing the number of lines only in a low gradation region of a low line number screen excellent in color stability. A screen configuration that satisfies such a condition has been examined. As means for achieving the above-described goal, the dot growth method using a void halftone dot shape developed by the inventors of the present invention is used. The dot growth method using a void halftone dot shape is superior in color stability to a halftone dot screen using a normal halftone dot shape and is characterized in that as the void halftone dot shape is formed earlier (at lower gradation), the color stability of the subsequent gradation improves. The void halftone dot shape is additionally characterized in that as the number of screen lines increases, the void halftone dot shape can be formed at the lower gradation.

Accordingly, when the intermediate and subsequent gradation of a screen with a low number of lines around 175 lpi is configured such that the low gradation region in a screen in the dot growth method using a void halftone dot shape is grown continuously from a low number of lines to a high number of lines and from a high number of lines to a low number of lines, both reduction in texture and high color stability can be achieved.

As a result of studies, it has been revealed that even using this dot growth method, texture occurs in the colors G and R if this growth method is applied to all the colors. Then, this dot growth method is applied exclusively to the colors C, M, and K, and the number of lines in the color Y is set higher than the normal low number of lines of the screens of the other colors, whereby the occurrence of texture can be avoided. That is, we take advantage of the phenomenon in which even when the number of screen lines is increased in the color Y alone in the screen with a low number of lines, the yellow dot arrangement is not visually recognized and looks equivalent to an image drawn with a normal screen with a low number of lines.

Method of Generating Dither Pattern in the Present Embodiment

A halftone dot screen using void halftone dots to be stored in the dither pattern storage unit 32 of the image forming apparatus 10 in the present embodiment will now be described. FIG. 6 is a diagram illustrating an example of generation of a dither pattern. Specifically, FIG. 6 illustrates an example of dot growth in shifting from halftone dots to void halftone dots. In FIG. 6, the growth center dc illustrated in a screen Sr1 is a dot serving as a starting point when the screen grows. The dot block db (halftone dot portion) illustrated in the screen Sr1 is a group of dots. The bridge dk illustrated in a screen Sr1 is a portion where the dot blocks db are connected to each other.

The dot growth method for a halftone dot screen using a void halftone dot shape will now be described. First of all, in order to stabilize adhesion of toner, toner is placed around the growth centers dc to form dot blocks db as halftone dots (screen Sr1). Then, one ends of dot blocks db are grown (screen Sr2). Then, bridges dk are formed and the formed bridges dk are grown in the shape of a line (screen Sr3). Bridges dk are further formed to be grown in another direction. Void halftone dots ws surrounded by the bridges dk are thus formed (screen Sr4).

Figure 7:
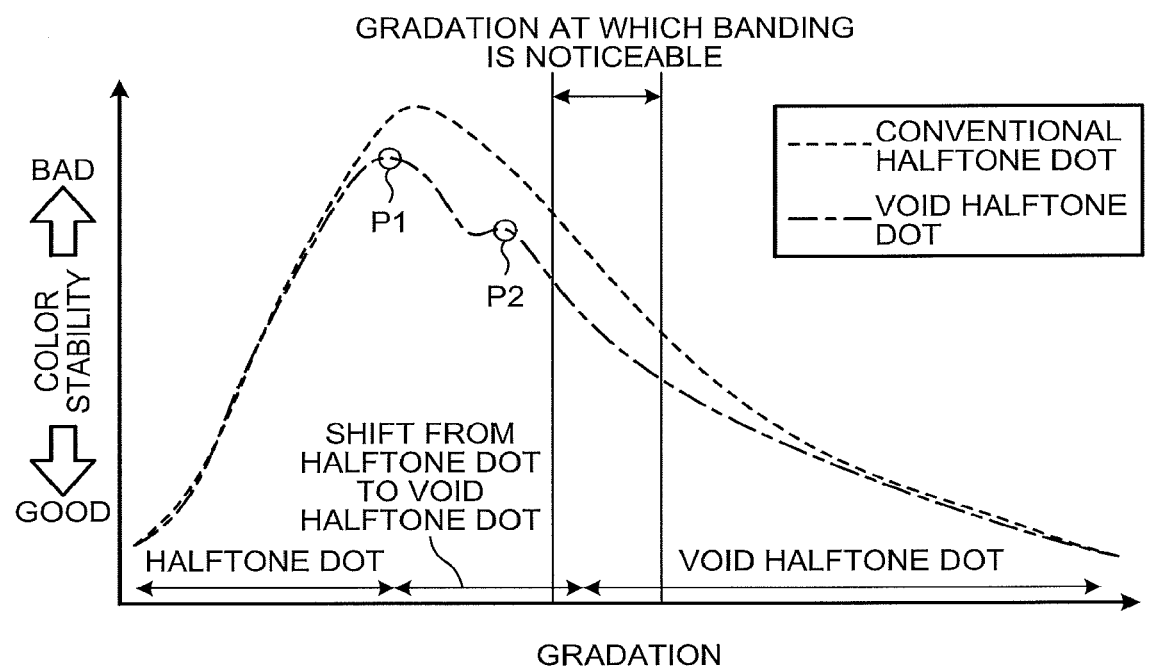
FIG. 7 is a graph illustrating an example of the improvement effect of color stability by a screen using void halftone dots.

Referring now to FIG. 7, the difference in color stability between the conventional halftone dot screen and the void halftone dot screen used in the present embodiment will be described. FIG. 7 is a graph illustrating an example of the improvement effect in color stability by the screen using the void halftone dots ws.

In FIG. 7, the horizontal axis indicates the gradation value of an image. The vertical axis indicates color stability and indicates that as the graph line goes upward, the color stability is worse. As illustrated in FIG. 7, with the conventional halftone dot screen processing without forming void halftone dots ws (dashed line), the color stability is worse in intermediate gradation. When the halftone dot screen is used, banding appears to exhibit unevenness in density in the shape of periodic strips, in the halftone portion (intermediate gradation portion) of the image, specifically, a region in which an output area ratio indicating the opening ratio of the screen is 40% to 50%. With the conventional halftone dot screen processing (the dashed line in FIG. 7), the gradation at which the color stability is worse and the gradation at which banding is noticeable overlap each other, and the degree of the appearing banding is bad.

By contrast, with the processing with void halftone dots ws (the dashed and single-dotted line in FIG. 7), toner adhesion is most unstable immediately before the bridges dk are formed, and two peaks (first peak P1, second peak P2) occur in color stability. However, compared with the case using the conventional halftone dot screen, the color stability after formation of void halftone dots is improved as the gradation is higher. In particular, the formation of void halftone dots is finished before the output area ratio of the screen reaches 40%, whereby both of the first peak P1 and the second peak P2 of color variation can be eliminated from the gradation region in which banding is noticeable. This processing alleviates the noticeability of banding.

Figure 8:
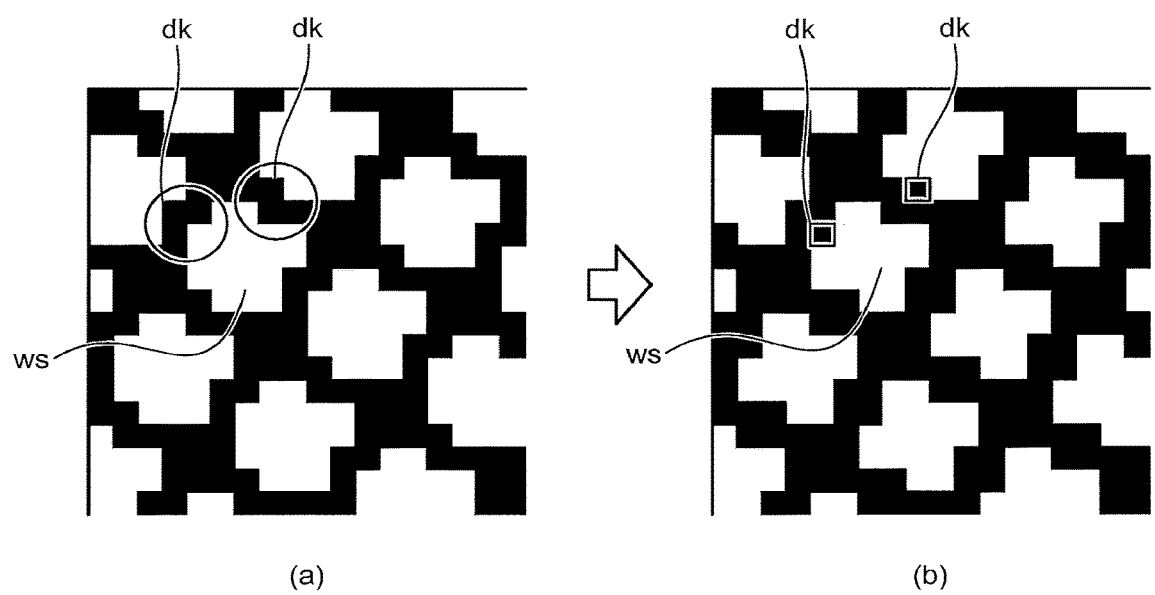
FIG. 8 is a diagram illustrating a state immediately after void halftone dots are formed by bridges in two different directions according to the present embodiment.

FIG. 8 is a diagram illustrating a state immediately after the void halftone dots ws surrounded by the bridges dk extending in two different directions are formed. In (a) of FIG. 8, the bridge dk is formed with a line having a thickness of one dot (the portion surrounded by a circle in the figure). In this manner, when the bridge dk is formed with a line having a thickness of one dot both in two directions, the adhesion of toner to the bridge dk is unstable because the line is thin. In general, when the inter-dot distance is smaller than 50 μm (equivalent to one dot in the case of 1200 dpi), the adhesion of toner is unstable.

Then, as illustrated in (b) of FIG. 8, the screen generator 38 performs dot growth such that the bridge dk forming the outer periphery of the void halftone dot ws is a line having a thickness of two or more dots. This formation processing is depicted by a square portion in (b) of FIG. 8, which corresponds to the portion surrounded by a circle in (a) of FIG. 8(a). This processing can prevent deterioration of stability of toner adhesion after void halftone dots ws are formed, resulting in improvement in image quality and stability of image quality.

Figure 9:
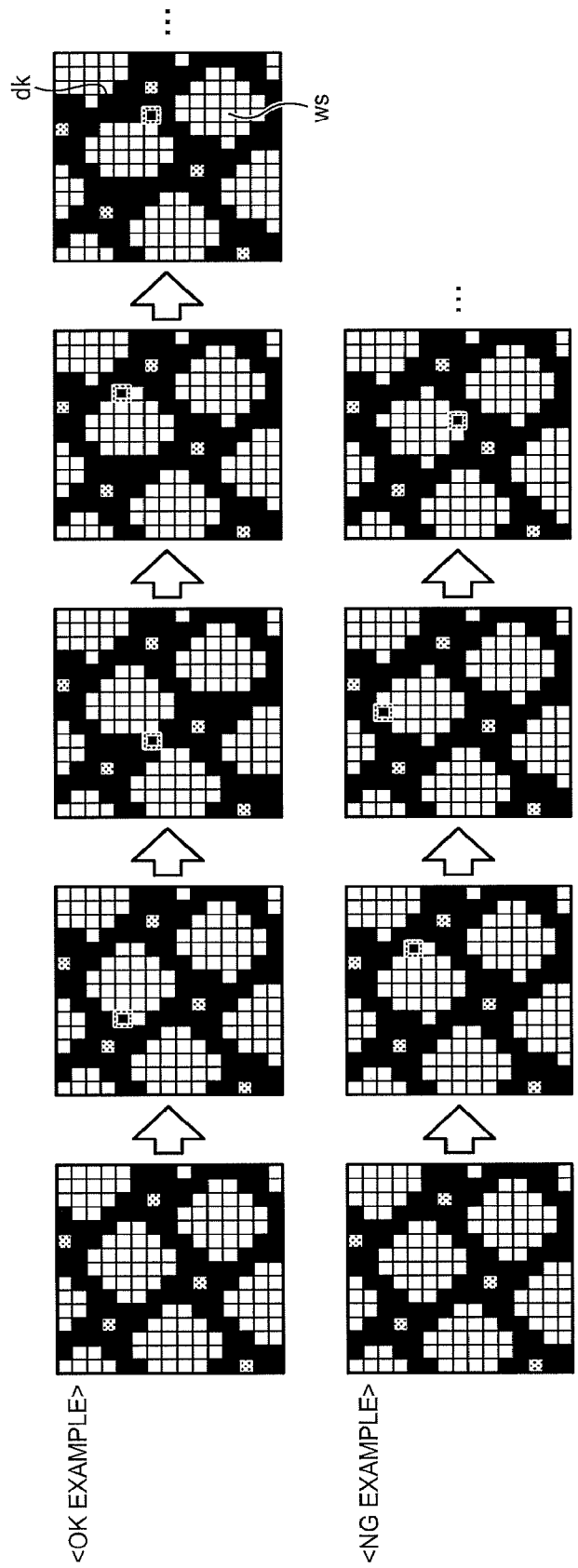
FIG. 9 is a diagram illustrating an example of the growth sequence of dots in a void halftone dot shape formed by bridges in two different directions according to the present embodiment.

FIG. 9 is a diagram illustrating an example of the dot growth sequence of void halftone dots ws formed with bridges dk in two different directions. FIG. 9 illustrates the growth method of void halftone dots ws, in which the protrusion of each void halftone dot ws consists of two dots. The upper column in FIG. 9 illustrates an appropriate growth example (OK example). The lower column in FIG. 9 illustrates an improper growth example (NG example). That is, in the upper column in FIG. 9, dot growth is performed such that one-dot protrusions are kept to a minimum in the void halftone dots ws, whereas in the lower column in FIG. 9, dot growth is performed irrespective of the frequency of appearance of one-dot protrusions in the void halftone dots ws. Accordingly, in the growth sequence in the upper column in FIG. 9, void halftone dots ws that do not make toner adhesion unstable can be formed.

Figure 10:
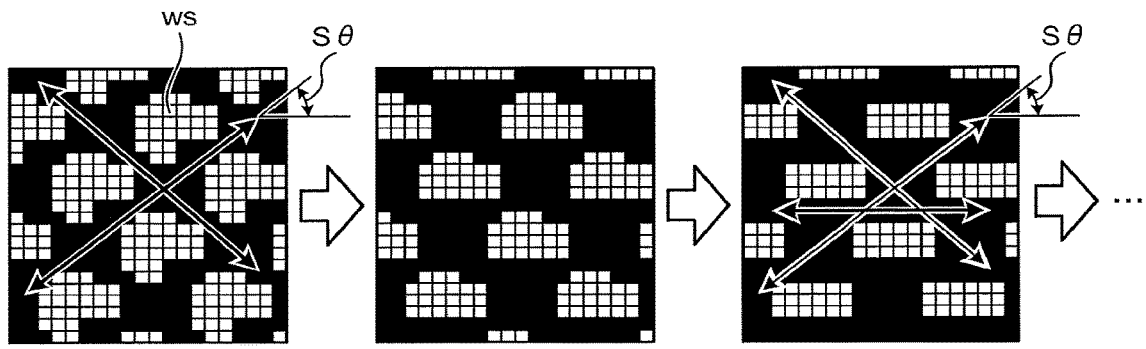
FIG. 10 is a diagram illustrating an inappropriate example (NG example) in which void halftone dots are formed such that a dot image is linearly arranged in the main-scanning direction.
Figure 11:
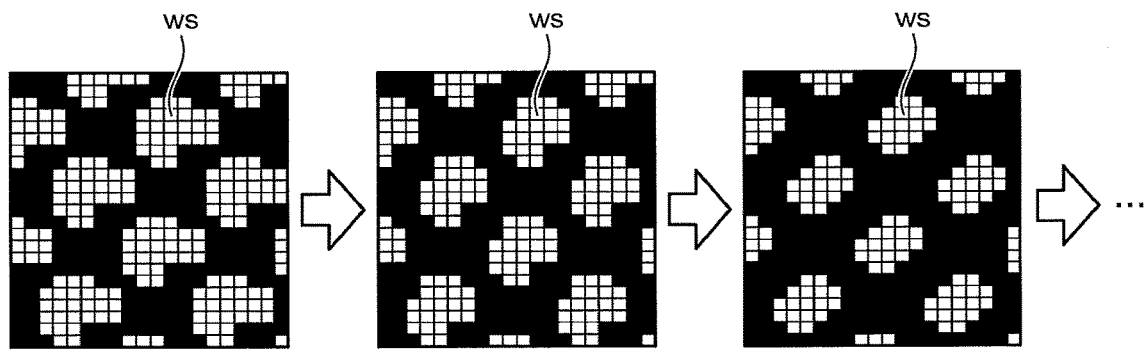
FIG. 11 is a diagram illustrating an appropriate example (OK example) in which void halftone dots are formed such that a dot image is linearly arranged along the screen angle.

FIG. 10 is a diagram illustrating an example in which void halftone dots ws are formed such that a dot image is linearly arranged in the main-scanning direction. FIG. 10 illustrates an example inappropriate in arrangement of the dot image (NG example). On the other hand, FIG. 11 is a diagram illustrating an example in which void halftone dots ws are formed such that a dot image is linearly arranged along the screen angle. That is, FIG. 11 illustrates an example appropriate in arrangement of the dot image (OK example).

When the dot image is linearly arranged in the main-scanning direction, if the void halftone dots ws are grown as illustrated in FIG. 10, the screen angle Sθ of the present screen image fails to be exploited. In the case of FIG. 10, a screen angle of 0 degrees, which is not good in stability, has a strong effect.

When the void halftone dot ws has the shape in FIG. 10, the void dot formation processor 38b forms void halftone dots ws along the screen angle Sθ as illustrated in FIG. 11. In this way, when a dot image is grown so as to fill the void halftone dots ws, the void dot formation processor 38b prevents the dot image from extending in the main-scanning direction and linearly, thereby avoiding deterioration in stability of toner adhesion in the void halftone dots ws and achieving improvement of image quality and stability of image quality.

Figure 12:
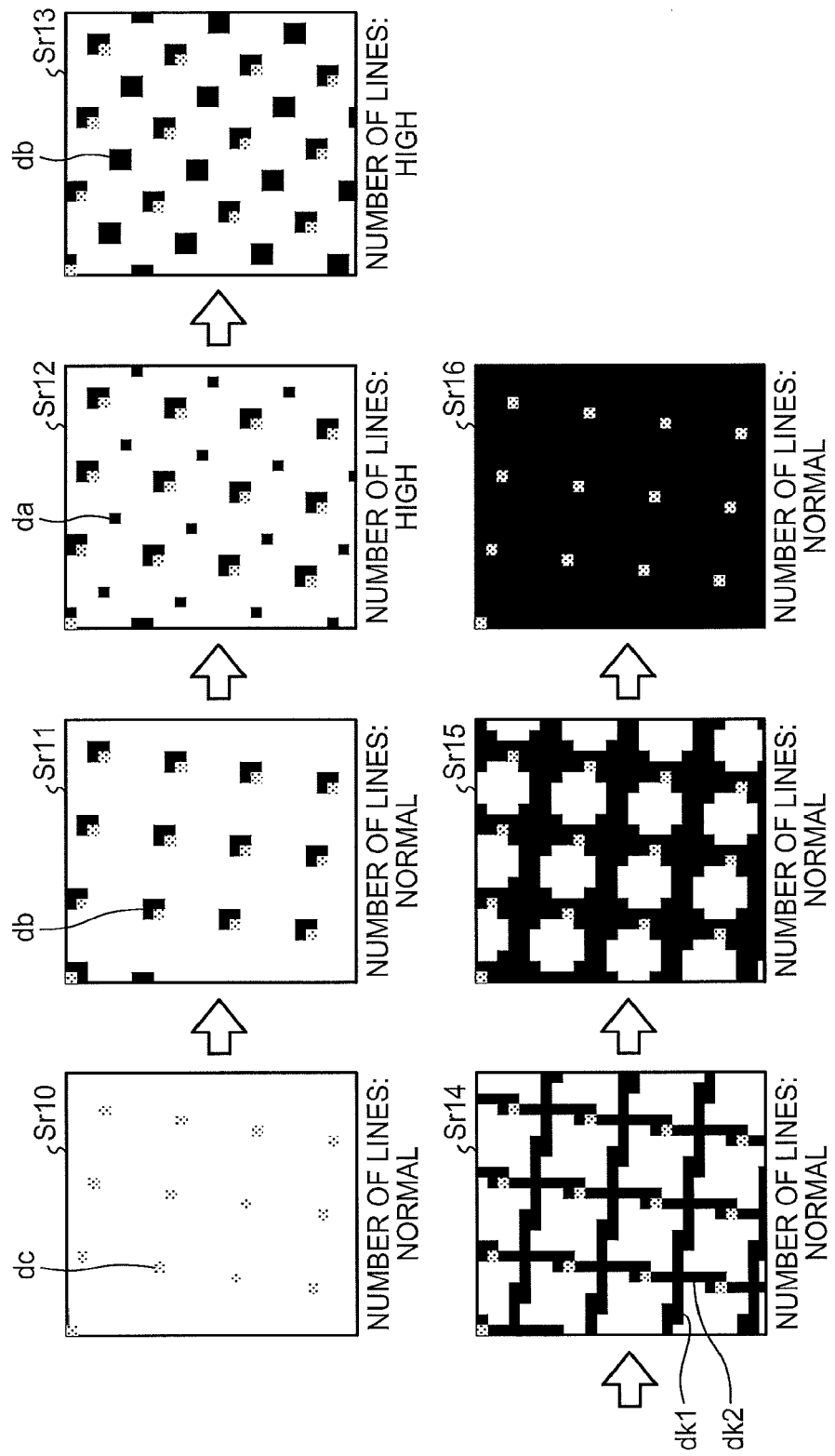
FIG. 12 is a diagram illustrating an example of the growth sequence of a halftone dot screen generated by the image forming apparatus.

FIG. 12 is a diagram illustrating an example of the growth sequence of a halftone dot screen generated by the image forming apparatus 10. As illustrated in FIG. 12, in order to achieve both reduction in texture and high color stability at the same time, while the dot growth method for a halftone dot screen using a void halftone dot shape illustrated in FIG. 6 is used, the dot growth sequence is such that the number of lines is high when the output area ratio is low, and the number of lines is low after the output area ratio is intermediate.

The dot growth method illustrated in FIG. 12 will be described below in order. First of all, in order to stabilize toner adhesion, toner is placed around the growth centers dc generated in a screen Sr10 to generate a screen Sr11 having dot blocks db formed therein.

Next, to increase the number of lines in the screen Sr11, dots da are placed each in the vicinity of the intersection of the diagonal lines of a square formed with the growth centers dc adjacent to each other to generate a screen Sr12.

To stabilize toner adhesion for the dots da placed in the screen Sr12, dots are placed around the dots da to form dot blocks db, thereby generating a screen Sr13.

Next, bridges dk1 are generated by connecting the dot blocks db formed in the screen Sr13 in the screen angle direction (growing a bridge structure). In addition, bridges dk2 are generated by connecting the dot blocks db grown around the growth centers dc generated in the screen Sr10. This processing generates a screen Sr14 grown in the void halftone dot shape with a low number of lines.

Subsequently, the growth continues so as to fill the void halftone dots ws from the periphery until a solid state (the output area ratio is 0%) is reached. That is, the state of a screen Sr16 is attained through the state of a screen Sr15.

As an example, when dots da are placed each at the intersection of the diagonals of a square formed with adjacent growth centers dc, the number of screen lines is 1.4 times ($2^{1/2}$ times) as many as the original number of screen lines at the stage of the screen Sr12. At the point of time when the formation of the void halftone dot shape of the screen Sr14 is finished, the number of lines returns to the original number of screen lines. Meanwhile, the color stability is slightly reduced because of the increased number of screen lines but instead texture can be improved.

To compensate for reduction in color stability at the gradation at this point of time, the formation of the void halftone dot shape is finished earlier before the output area ratio is 40%. The reason is as follows: Since the high number of lines reduces the distance between dot blocks db and enables formation of a bridge structure at less gradation, the void halftone dot shape can be formed earlier. As the formation of the void halftone dot shape is finished earlier, the subsequent color stability is improved.

Image Quality Improvement Effect by the Present Embodiment

Figure 13:
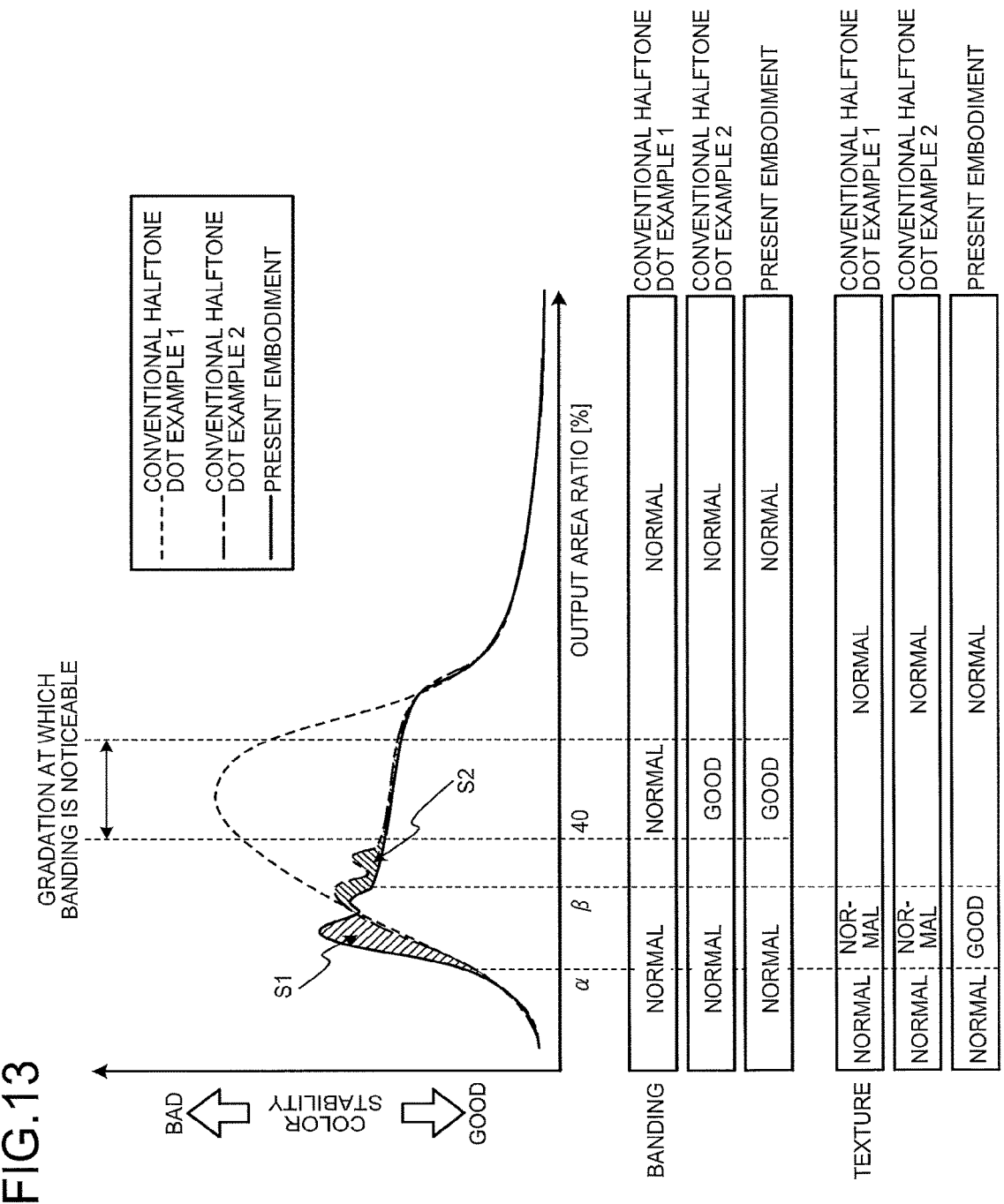
FIG. 13 is a diagram illustrating the image quality improvement effect by a halftone dot screen generated by the image forming apparatus.

Referring now to FIG. 13, the image quality improvement effect in the image forming apparatus 10 will be described. FIG. 13 is a graph illustrating the image quality improvement effect by the halftone dot screen generated by the image forming apparatus 10.

In FIG. 13, the horizontal axis represents the output area ratio, that is, the proportion of void halftone dots per unit area, and the vertical axis represents color stability. The graph indicates that as the value of the vertical axis decreases, the color stability increases. All of the three screens depicted in the graph are created such that the number of screen lines is 170 lpi and the screen angle is 82 degrees, where in part of the gradation in the present embodiment, the number of screen lines is 240 lpi, 1.4 times as many as 170 lpi. In the graph, a indicates the output area ratio at which the number of lines starts increasing, and indicates the output area ratio at which the formation of the void halftone dot shape with a low number of lines is finished. The output area ratio may be considered to be equivalent to the gradation value of the image.

First of all, Conventional Halftone Dot Example 2 using void halftone dots ws will be described. It can be understood that, owing to the effect of the dot growth method using void halftone dots ws described with reference to FIG. 6 and FIG. 8 to FIG. 11, Conventional Halftone Dot Example 2 is superior in color stability to Conventional Halftone Dot Example 1 according to the dot growth method using a normal halftone dot shape rather than void halftone dots ws. It is also understood that although Conventional Halftone Dot Example 2, using void halftone dots ws, exhibits two peaks in color stability (see FIG. 7), the color stability is improved compared with Conventional Halftone Dot Example 1, after the output area ratio of 40% at which void halftone dots ws are formed. Unlike Conventional Halftone Dot Example 1, Conventional Halftone Dot Example 2 succeeds in improving banding because the gradation at which banding is noticeable does not overlap the peaks of color variation. As for the texture, Conventional Halftone Dot Example 2 is equivalent to Conventional Halftone Dot Example 1.

The improvement effect achieved by the halftone dot screen for use in the image forming apparatus 10 in the present embodiment will now be described. In this example, the number of lines starts increasing at the area ratio of 18% ($\alpha$=18), and the formation of void halftone dots ws is finished at the output area ratio of 34% ($\beta$=34). Since the halftone dot screen in the present embodiment has a high number of lines (240 lpi) in a partial low gradation region, the color stability in this gradation region is inferior to that of Conventional Halftone Dot Example 1 or Conventional Halftone Dot Example 2 (the portion of the region S1 in FIG. 13). However, since void halftone dots ws are formed earlier, the halftone dot screen in the present embodiment is superior to Conventional Halftone Dot Example 2 in color stability up to the output area ratio of 40% at which Conventional Halftone Dot Example 2 finishes formation of void halftone dots ws (the region S2 in FIG. 13). It can be understood that consequently, the halftone dot screen in the present embodiment can reduce texture while having color stability equivalent to that of Conventional Halftone Dot Example 2 (the area of the region S1=the area of the region S2).

Banding is also improved in the present embodiment compared with Conventional Halftone Dot Example 1, because the peak of color variation does not overlap the gradation region in which banding is noticeable, as in Conventional Halftone Dot Example 2.

Screen Generation Processing in the Present Embodiment

Figure 14:
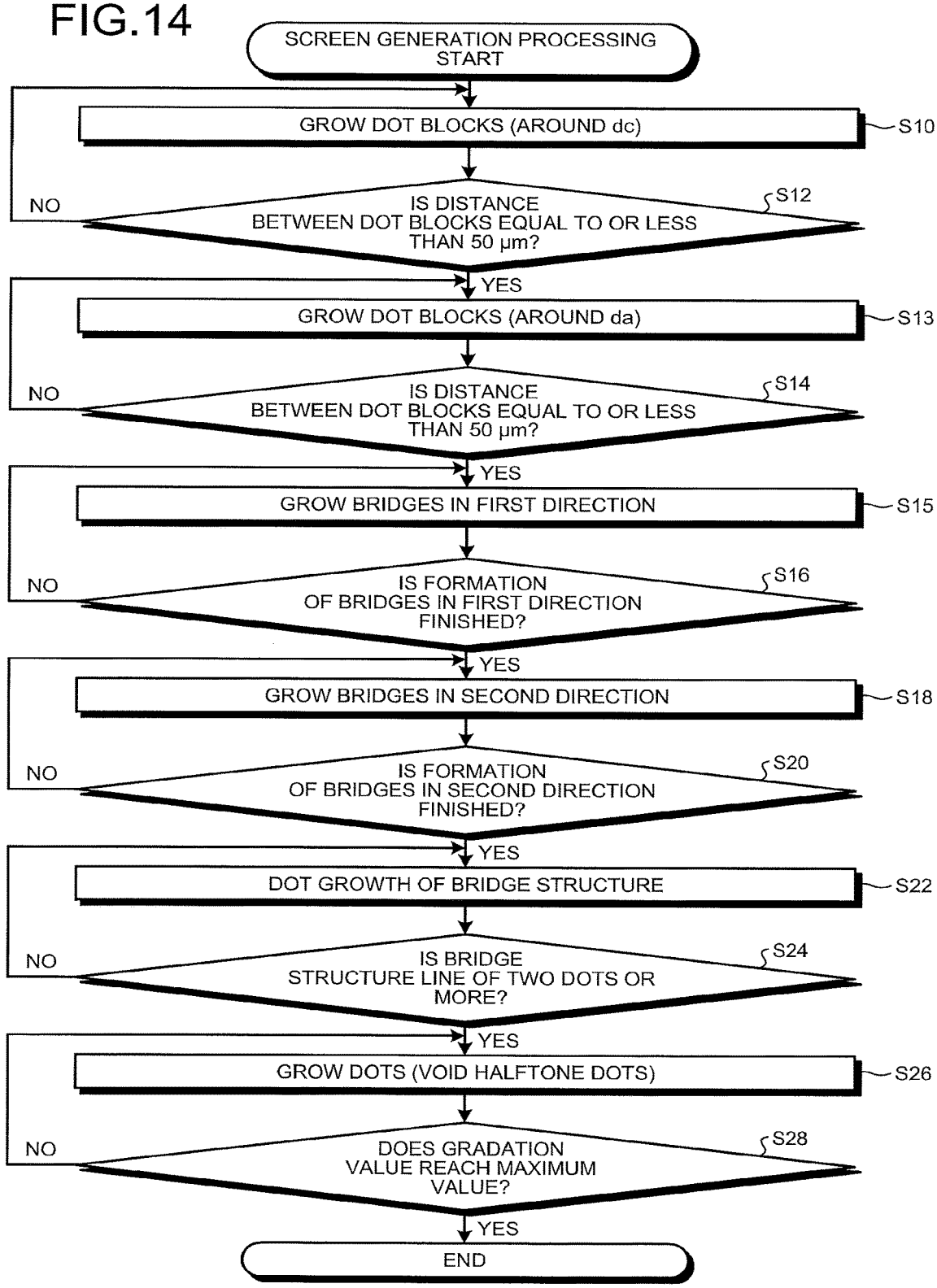
FIG. 14 is a flowchart illustrating screen generation processing performed by the image forming apparatus.

Referring now to FIG. 14, the screen generation processing performed by the image forming apparatus 10 will be described. FIG. 14 is a flowchart illustrating the screen generation processing performed by the image forming apparatus 10. The image forming apparatus 10 executes the processing in the flowchart in FIG. 14 for each of the colors C, M, and K. For the color Y, even when the number of screen lines is increased, the dot arrangement of the color Y is not visually recognizable, and the image looks equivalent to an image drawn with the normal screen with a low number of lines, as previously mentioned. A screen for the color Y is thus generated by the dot block growth method without changing the number of screen lines.

The halftone dot generator 38a places dots around the growth centers dc and grows dot blocks starting from the growth centers dc, by the same method as in the normal halftone dot screen (step S10).

The halftone dot generator 38a determines whether the distance dl between dot blocks db is equal to or less than 50 μm (step S12). When the distance dl between dot blocks db is equal to or less than 50 μm (Yes at step S12), the processing proceeds to step S13. When the distance dl between dot blocks db is not equal to or less than 50 μm (No at step S12), the processing returns to step S10.

The halftone dot generator 38a places dots da each in the vicinity of the intersection of the diagonal lines of a square formed with adjacent dots and grows dot blocks db starting from the dots da by the same method as in the normal halftone dot screen (step S13).

The halftone dot generator 38a determines whether the distance dl between dot blocks db is equal to or less than 50 μm (step S14). When the distance dl between dot blocks db is equal to or less than 50 μm (Yes at step S14), the processing proceeds to step S15. When the distance dl between dot blocks db is not equal to or less than 50 μm (No at step S14), the processing returns to step S13.

The void dot formation processor 38b grows bridges dk1 in a first direction in order to form the halftone dot shape into the void halftone dot shape with a low number of lines (step S15). Subsequently, the void dot formation processor 38b determines whether the formation of the bridges dk1 in the first direction is finished (step S16). When it is determined that the formation of the bridges dk1 in the first direction is finished (Yes at step S16), the processing proceeds to step S18. When it is determined that the formation of the bridges dk1 in the first direction is not finished (No at step S16), the processing returns to step S15.

The void dot formation processor 38b grows bridges dk2 in a second direction (step S18). Subsequently, the void dot formation processor 38b determines whether the formation of the bridges dk2 in the second direction is finished (step S20). When it is determined that the formation of the bridges dk2 in the second direction is finished (Yes at step S20), the processing proceeds to step S22. When it is determined that the formation of the bridges dk2 in the second direction is not finished (No at step S20), the processing returns to step S18.

The void dot formation processor 38b grows dots to form bridges dk1 and bridges dk2 (step S22). Subsequently, the void dot formation processor 38b determines whether the bridge structure (the bridges dk1 and the bridges dk2) has grown into a line of two dots or more (step S24). When it is determined that the bridge structure has grown into a line of two dots or more (Yes at step S24), the processing proceeds to step S26. When it is determined that the bridge structure has not grown into a line of two dots or more (No at step S24), the processing returns to step S22.

The dot generator 38c grows dots of void halftone dots ws surrounded by the bridge structure (step S26). In doing this, the dot generator 38c grows dots such that fine protrusions of void halftone dots ws are minimized and that dots are not linearly arranged in a row in the main-scanning direction.

The dot generator 38c determines whether the gradation value of the screen reaches the maximum value, that is, the solid state (step S28). When it is determined that the gradation value of the screen has reached the maximum value (Yes at step S28), the screen generation processing ends. When it is determined that the gradation value of the screen has not reached the maximum value (No at step S28), the processing returns to step S26.

Although not illustrated in the flowchart in FIG. 14, when a screen at a predetermined gradation value, that is, a predetermined output area ratio is generated, the screen generator 38 stores information of the generated screen as a dither pattern in association with the gradation value of the image data into the dither pattern storage unit 32.

Dither Processing in the Present Embodiment

Figure 15:
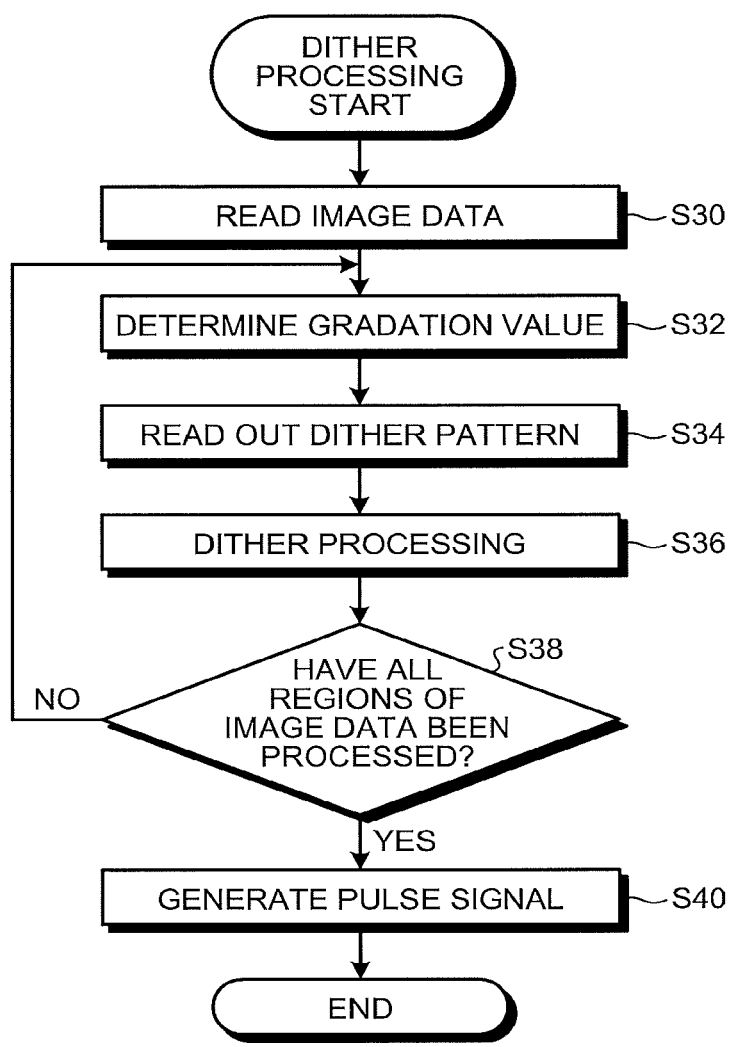
FIG. 15 is a flowchart illustrating dither processing performed by the image forming apparatus.

Referring now to FIG. 15, the dither processing performed by the image forming apparatus 10 will be described. FIG. 15 is a flowchart illustrating the dither processing performed by the image forming apparatus 10.

The image determiner 30 reads image data (step S30).

The image determiner 30 determines a gradation value for each certain range of the read image data (step S32).

The dither processor 34 reads out a dither pattern corresponding to the gradation value determined by the image determiner 30, from among the dither patterns stored in the dither pattern storage unit 32 (step S34).

The dither processor 34 performs dither processing of applying the read dither pattern to the corresponding region in the image data (step S36).

The dither processor 34 determines whether the dither processing has been completed for all the regions in the image data (step S38). When it is determined that the dither processing has been completed for all the regions in the image data (Yes at step S38), the processing proceeds to step S40. When it is determined that the dither processing has not been completed for all the regions in the image data (No at step S38), the processing returns to step S32.

The PWM unit 36 generates a pulse signal having a pulse width corresponding to the gradation value, for the image subjected to the dither processing (step S40). The processing in FIG. 15 then ends.

As described above, in the image forming apparatus 10 as an example of the image processing apparatus according to the present embodiment, the dither processor 34 (dither decider) reads a gradation value for each region in the image data input for each toner color and decides a dither pattern to be applied to the gradation value. The dither processor 34 then reads out a halftone dot screen corresponding to the decided dither pattern from the dither pattern storage unit 32 (dither table) that stores therein a plurality of halftone dot screens using the void halftone dot shape in which the output area ratio that is the proportion of void halftone dots ws per unit area corresponds to each gradation value of the image data. The dither processor 34 then performs dither processing of applying the read halftone dot screen to the corresponding region in the image data. This configuration achieves both reduction in texture produced in a pseudo manner and improvement in color stability of the image in a gradation range from intermediate gradation to high gradation in electrophotography.

In the image forming apparatus 10 as an example of the image processing apparatus according to the present embodiment, the screen generator 38 forms the halftone dot screen such that the formation of void halftone dots ws is finished when the output area ratio that is the proportion of void halftone dots is 40% or less. Since the formation of void halftone dots ws is completed before banding appears, banding that is unevenness in density in the form of strips can be less noticeable.

In the image forming apparatus 10 according to the present embodiment, the screen generator 38 forms the halftone dot screen by performing dot growth such that the number of screen lines that is the number of dots per inch within a range of the output area ratio from 18% to 34% is greater than the number of screen lines outside the range. This configuration can further improve the image quality of the halftone dot screen and the stability of the image quality in a gradation range from intermediate gradation to high gradation.

In the image forming apparatus 10 according to the present embodiment, the screen generator 38 forms the halftone dot screen by performing dot growth for the image data of toner colors C, M, and K such that the number of screen lines of one or more colors is greater than the number of screen lines of the other colors. This configuration also reduces the occurrence of pseudo texture.

In the image forming apparatus 10 according to the present embodiment, the screen generator 38 forms the halftone dot screen by growing bridges dk1 and dk2 in two directions serving as the outer periphery of the void halftone dots ws, each into a line having a thickness of two dots or more and thereafter growing void halftone dots ws such that void halftone dots ws become smaller. This configuration prevents deterioration in color stability after the formation of void halftone dots ws and improves the image quality and stability of the halftone dot screen.

In the image forming apparatus 10 according to the present embodiment, the screen generator 38 forms the halftone dot screen by performing dot growth along the screen angle S$\theta$ such that the dots that form the outer periphery of the void halftone dots ws are not linearly arranged in a row in the main-scanning direction. This configuration prevents deterioration in stability of toner adhesion to the void halftone dots ws and improves the image quality and stability.

For example, the control program P described in the embodiment may be stored in advance in the ROM 14 as storage means or may be recorded on a computer-readable recording medium such as a compact disc-read only memory (CD-ROM), a flexible disk (FD), a compact disc-recordable (CD-R), and a digital versatile disc (DVD) in a file in an installable format or in an executable format. Alternatively, the control program P may be stored in a computer connected to a network such as the Internet and downloaded via the network. Alternatively, the control program P may be provided or distributed via a network such as the Internet.

The present invention can achieve both reduction in texture produced in a pseudo manner and improvement in color stability of images in a gradation range from intermediate gradation to high gradation in electrophotography.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus, comprising:
   a memory to store a dither table in which a plurality of dither patterns are recorded, each of the dither patterns being formed with a halftone dot screen in which an output area ratio that is a proportion of void halftone dots per unit area corresponds to any one of gradation values of image data; and
   processing circuitry configured to
      read a gradation value for each region in image data input for each toner color,
      decide a dither pattern to be applied to the read gradation value, wherein the dither pattern is the halftone dot screen formed such that formation of a void halftone dot shape is finished at an output area ratio of 40% or less, and the dither pattern is formed by performing dot growth such that a first number of screen lines, defined as a number of halftone dots per inch, within a range of an output area ratio of 18% to 34% is greater than a second number of screen lines outside the range,
      read out the decided dither pattern from the dither table, and
      perform dither processing of applying the read dither pattern to the region in the image data.

2. The image processing apparatus according to claim 1, wherein the dither pattern is formed by performing dot growth for image data of each of toner colors cyan, magenta, and black such that a number of screen lines of one or more of the toner colors is greater than a number of screen lines of the other toner colors.

3. The image processing apparatus according to claim 1, wherein the dither pattern is formed by growing bridges in two directions, the bridges serving as an outer periphery of the void halftone dots, each into a line having a thickness of two dots or more, and thereafter growing the void halftone dot shape such that the void halftone dots become smaller.

4. The image processing apparatus according to claim 1, wherein the dither pattern is formed by performing dot growth such that dots in the halftone dot screen are not linearly arranged in a row in a main-scanning direction.

5. An image processing method, comprising:
   reading a gradation value for each region in image data input for each toner color;
   deciding a dither pattern to be applied to the read gradation value, wherein the dither pattern is the halftone dot screen formed such that formation of a void halftone dot shape is finished at an output area ratio of 40% or less, and the dither pattern is formed by performing dot growth such that a first number of screen lines, defined as a number of halftone dots per inch, within a range of an output area ratio of 18% to 34% is greater than a second number of screen lines outside the range;
   reading out a screen corresponding to the dither pattern from a dither table in which a plurality of dither patterns are recorded, each of the dither patterns being formed with a halftone dot screen in which an output area ratio that is a proportion of void halftone dots per unit area corresponds to any one of gradation values of image data; and
   performing dither processing of applying the read screen to the region in the image data.

6. A non-transitory computer-readable recording medium with an executable program stored thereon, wherein the program, when executed by a computer that includes a memory to store a dither table in which a plurality of dither patterns are recorded, each of the dither patterns being formed with a halftone dot screen in which an output area ratio that is a proportion of void halftone dots per unit area corresponds to any one of gradation values of image data, causes the computer to perform:
   reading a gradation value for each region in image data input for each toner color,
   deciding a dither pattern to be applied to the read gradation value, wherein the dither pattern is the halftone dot screen formed such that formation of a void halftone dot shape is finished at an output area ratio of 40% or less, and the dither pattern is formed by performing dot growth such that a first number of screen lines, defined as a number of halftone dots per inch, within a range of an output area ratio of 18% to 34% is greater than a second number of screen lines outside the range,
   reading out the decided dither pattern from the dither table; and performing dither processing of applying the read dither pattern to the region in the image data.

\* \* \* \* \*